METHOD AND APPARATUS FOR INSERTING A THREE-SIDED WRAP

Original Filed Dec. 17, 1970 6 Sheets-Sheet 1

METHOD AND APPARATUS FOR INSERTING A THREE-SIDED WRAP

Original Filed Dec. 17, 1970 6 Sheets-Sheet 2

METHOD AND APPARATUS FOR INSERTING A THREE-SIDED WRAP

Original Filed Dec. 17, 1970 6 Sheets-Sheet 3

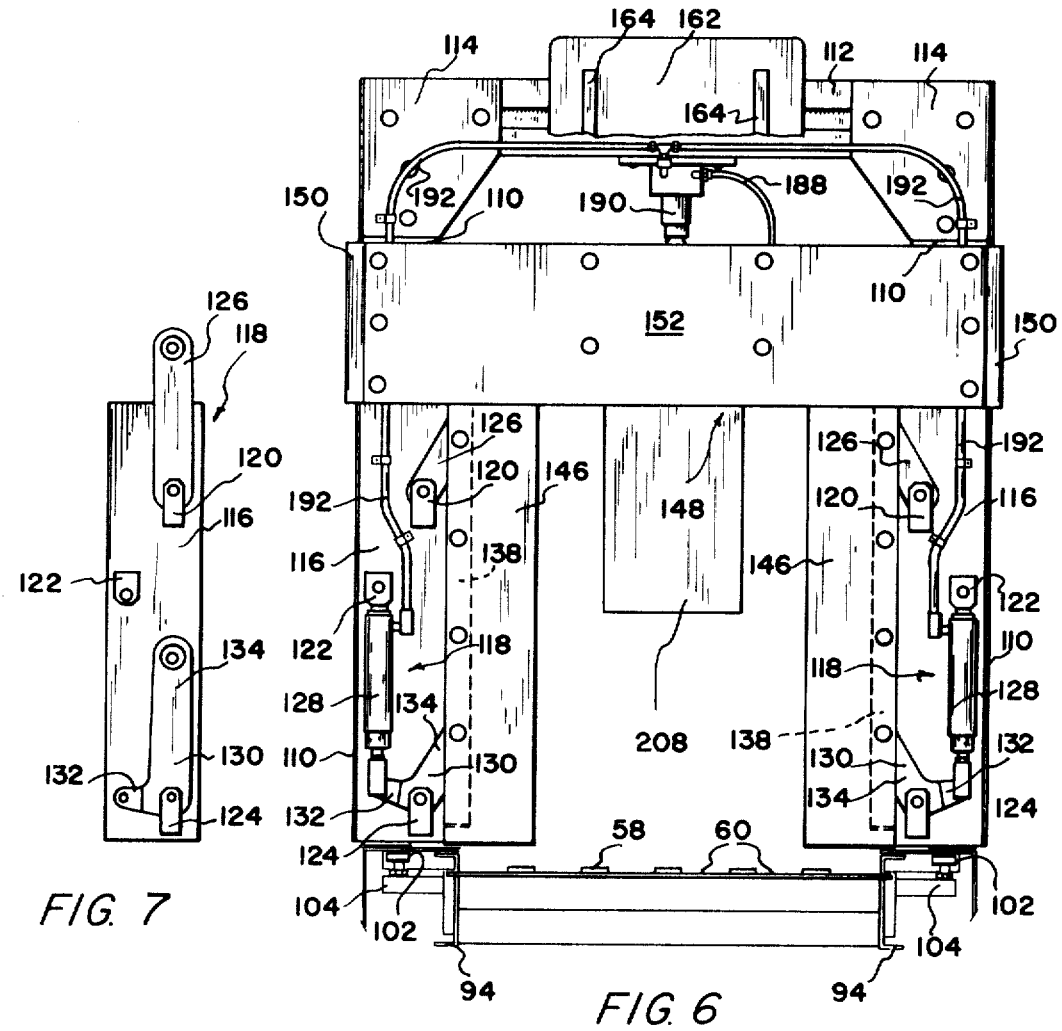
FIG. 7
FIG. 6
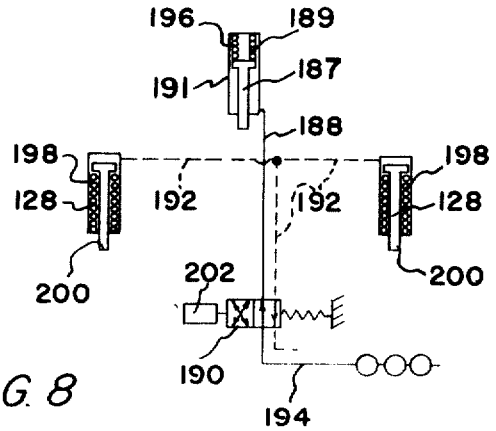
FIG. 8

METHOD AND APPARATUS FOR INSERTING A THREE-SIDED WRAP

Original Filed Dec. 17, 1970 6 Sheets-Sheet 5

METHOD AND APPARATUS FOR INSERTING A THREE-SIDED WRAP

Original Filed Dec. 17, 1970 6 Sheets-Sheet 6

United States Patent Office

Re. 28,277
Reissued Dec. 17, 1974

28,277

METHOD AND APPARATUS FOR INSERTING A THREE-SIDED WRAP

James C. Wright, Golden, Colo. and Peter Nemeth, Den Haag, Netherlands, assignors to Cutler-Hammer, Inc., Milwaukee, Wis.

Original No. 3,716,960, dated Feb. 20, 1973, Ser. No. 99,156, Dec. 17, 1970. Application for reissue Sept. 24, 1973, Ser. No. 400,335

Int. Cl. B65b *11/06, 41/16*

U.S. Cl. 53—3 18 Claims

Matter enclosed in heavy brackets [ ] appears in the original patent but forms no part of this reissue specification; matter printed in italics indicates the additions made by reissue.

ABSTRACT OF THE DISCLOSURE

This invention relates to an accessory attachment for a bottom wrap inserter that converts the latter apparatus to a three-sided wrap inserter. Specifically, the attachment takes the web from the bottom wrap inserter and feeds it vertically up a pair of retractable transversely-spaced tracks that engage the side margins thereof. The leading edge of the web is held against the front face of an overhead plate by a retractable pressure member while the tracks are retracted to leave the side margins free. The incoming stack passes between the tracks in retracted position on the conveyor top of the bottom wrap inserter and engages the web blocking its path, whereupon, the web is pulled free and the leading edge thereof lays back across the top of the stack. Meanwhile, as the stack continues to move forward along the conveyor table of the bottom wrap inserter, it pulls an additional length of web from the supply roll thereof which is subsequently severed in the usual manner. The resulting sheet wrap covers the top, leading end and bottom of the stack instead of the bottom alone. The invention also encompasses the novel method of inserting a three-sided wrap which comprises pushing the leading edge of a web vertically up into position to intercept an incoming stack by guiding the side margins thereof in slotted tracks, holding the leading edge of the web at a superimposed position above the stack while the tracks are retracted to remote locations permitting the stack to pass freely therebetween, allowing the stack to pull the leading edge of the wrap free by impinging thereagainst thus defining a flap adapted to lay back along the top thereof, and cutting the web free of the supply roll therefor at a location underneath the stack thus freeing a bottom-covering flap.

*This application is an application for reissue based upon U.S. Application Ser. No. 099,156 filed Dec. 17, 1970, issued as U.S. Pat. No. 3,716,960 on Feb. 20, 1973.*

Bottom wrap inserting machines have been used for years in the publishing industry, particularly newspaper plants, to place a sheet wrap underneath a stack of papers or magazines preparatory to adding a top wrap sheet and tying all of these elements together to form a bundle. Ordinarily, while the bottom sheet wrap is inserted underneath the stack automatically and cut free of the supply roll, the top sheet wrap is placed in position atop the stack by hand and held there at least long enough to insure its staying in place while the bundle is tied.

It has now been found in accordance with the teaching of the instant invention that the manual operation of adding the top sheet wrap to the stack can be eliminated altogether by adding an attachment to the existing bottom wrap inserting apparatus that will convert it to a machine which will position and cut a sheet that will cover the top, leading end and bottom of the stack all in a single operation. The attachment mounts directly on top of bottom wrap inserting machines of the type forming the subject matter of Cutler-Hammer's United States Letters Patent No. 3,250,054 along with others relating to similar units. The attachment is a relatively simple one in that its sole function is to raise the leading edge of the web up and hold it in front of the incoming stack which impinges thereagainst and results in the wrap being folded back down over the top thereof. In order to accomplish the aforementioned function, the leading edge of the web must be guided vertically into a position where it blocks the path of an incoming stack rather than being allowed to lay down atop the conveyor table of the bottom wrap inserter as is the case without the attachment of the present invention. Since the width of the web is at least no greater than that of the incoming stack, the web-guiding tracks must, of necessity, occupy an extended operative position having a transverse spacing of insufficient width to permit the stack to pass therebetween; therefore, these tracks must be retracted into a position where they no longer block the progress of the stack in advance of the time it arrives. Before this can be done, however, the leading edge of the web must be held in a superimposed position above the path of the incoming stack so that side margin support provided by the tracks can be removed. Finally, once the stack has struck the web and pulled its leading edge free to lay back down along the top thereof thus defining both the top-covering flap and front of the wrap, such web must be cut free of its supply roll from a position beneath the stack thereby freeing the bottom-covering flap, the latter operation being one that is already performed by the existing bottom wrap insertion apparatus.

Accordingly, it is the principal object of the present invention to provide a novel accessory attachment for conventional bottom wrap inserters that converts them to machines for inserting three-sided wraps.

A second objective of the invention forming the subject matter hereof is to provide a unique method for inserting a three-sided wrap partially enveloping a stack of newspapers or the like preparatory to bundling same.

Another object of the invention herein disclosed and claimed is to provide an attachment for inserting three-sided wraps that will integrate readily with existing bottom wrap inserting machines of the general type having a web power-fed from a supply roll thereof up onto a conveying surface where the leading edge of the web is picked up by an incoming stack preparatory to cutting it free of the supply roll.

Still another objective of the instant invention is to provide an attachment of the type aforementioned that is readily demounted and disconnected from the bottom wrap inserter without interfering with its use in the conventional manner.

Further objects of the within-described invention are to provide a three-sided wrap conversion accessory that is readily demounted and disconnected from the bottom easy to service, adaptable for use with various types and sizes of stacked articles, and a unit of the class described that is most economical in that it eliminates the need for a manually-placed top wrap.

Other objects will be in part apparent and in part pointed out specifically hereinafter in connection with the description of the drawings that follows, and in which:

FIG. 6 is a rear elevation to a scale slightly smaller than FIG. 4 but larger showing the attachment with the protective shields removed;

FIG. 7 is a fragmentary detail to the same scale as FIG. 6 showing one of the track-actuating crank arms and its associated link in retracted position;

FIG. 8 is a diagram of the pneumatic system used to actuate the track-retraction subassembly and the web-holding subassembly;

Figure 1:
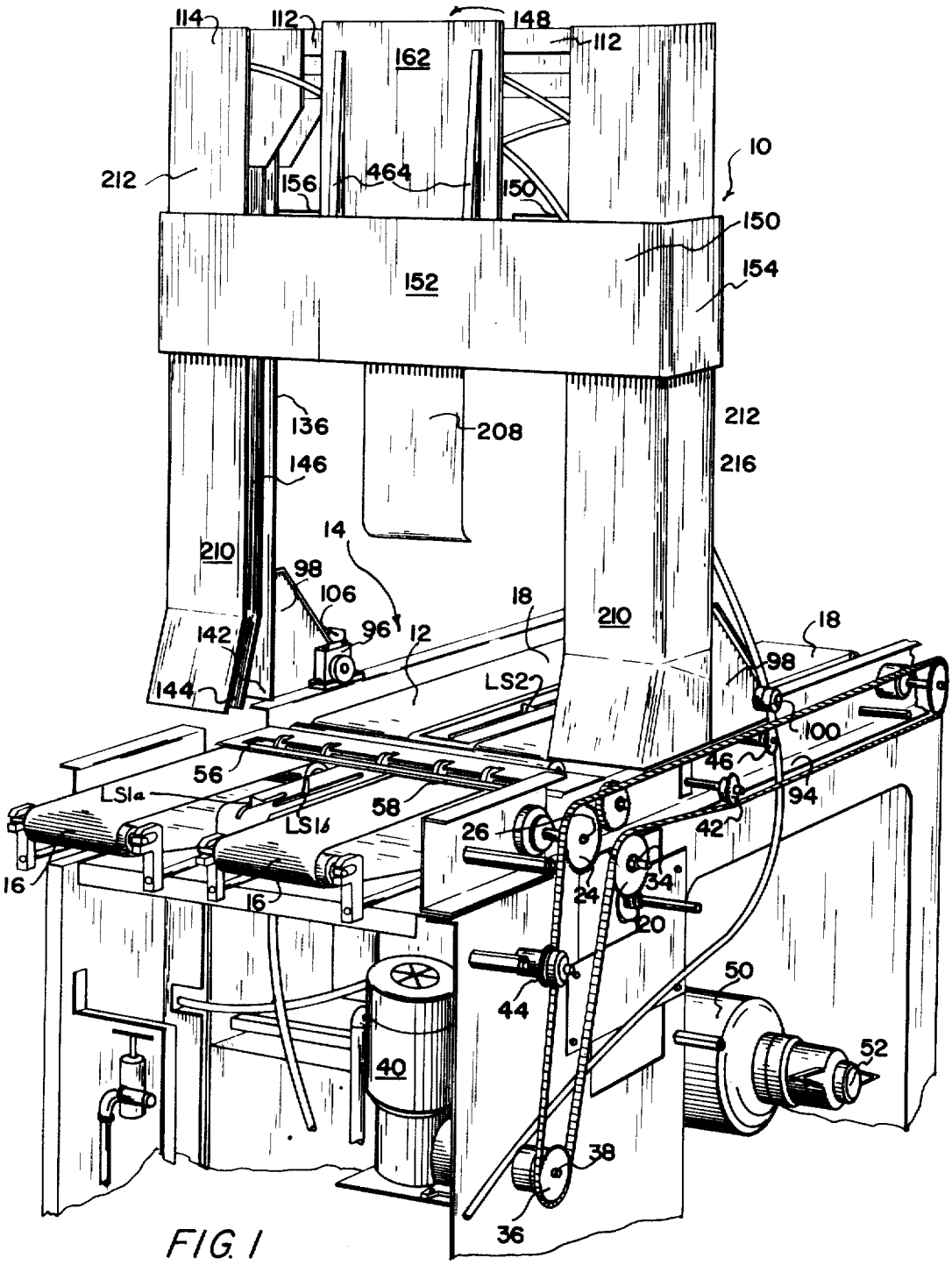
FIG. 1 is a fragmentary perspective view looking down and to the left at the rear face of the attachment shown mounted atop the conveyor table of a conventional bottom wrap inserter.

Referring next to the drawings for a detailed description of the present invention and, initially, to FIG. 1 for this purpose, reference numeral 10 has been chosen to designate in a general way the three-sided wrap insertion accessory forming the subject matter hereof and it will be seen to be mounted atop the conveyor top or table 12 of a conventional bottom wrap inserting apparatus that has been similarly referred to broadly by reference numeral 14. Since the accessory 10 is not only mounted atop the bottom wrap inserter 14 but is interrelated functionally thereto, it will be necessary to understand certain fundamental operations performed by the latter. The particular bottom wrap inserter 14 shown in the drawings is that which forms the subject matter of U.S. Pat. No. 3,250,052 and to which reference may be made for additional details. To aid in an understanding of the construction and mode of operation of the illustrated bottom wrap inserter, the reference numerals used in the aforementioned issued patent to identify corresponding parts referred to herein will be placed in parentheses alongside the ones found in the accompanying drawings.

The bottom wrap inserter has an incoming belt conveyor 16 (16) and an outgoing belt conveyor 18 (18) mounted atop the frame in longitudinally-spaced end-to-end relation. Between the discharge end of the incoming conveyor and the inlet end of the outgoing one is positioned the cutter drive unit which both feeds and cuts the web, the latter unit having been broadly designated by reference numeral 20 (20). An endless sprocket chain 22 (22) is reaved over sprocket 24 that is mounted on the roller shaft 26 that drives the incoming conveyor 16 (16), a similar sprocket 28 on the roller shaft 30 of the outgoing conveyor, sprocket 32 (60) on the main drive shaft 34 (58) of the cutter drive unit 20 (20), main drive sprocket 36 on the output shaft 38 of motor 40 (26), and three idler sprockets 42, 44 and 46. Both the incoming and outgoing conveyors are thus driven in the same direction and at the same speed by motor 40 (26).

The web 48 (28a) is taken off a supply roll 50 (28) that is housed beneath the outgoing conveyor on spindle 52 that extends transversely thereof. The leading edge 54 of the web emerges through a transverse slot 56 (108c) in coverplate 58 (108) that bridges the gap left between the incoming and outgoing conveyors. This coverplate has the front edge of its slot notched as shown at 60 (108d) in FIG. 6 to receive a transversely-spaced set of rollers 62 (116a) that are revealed in FIG. 5.

Figure 5:
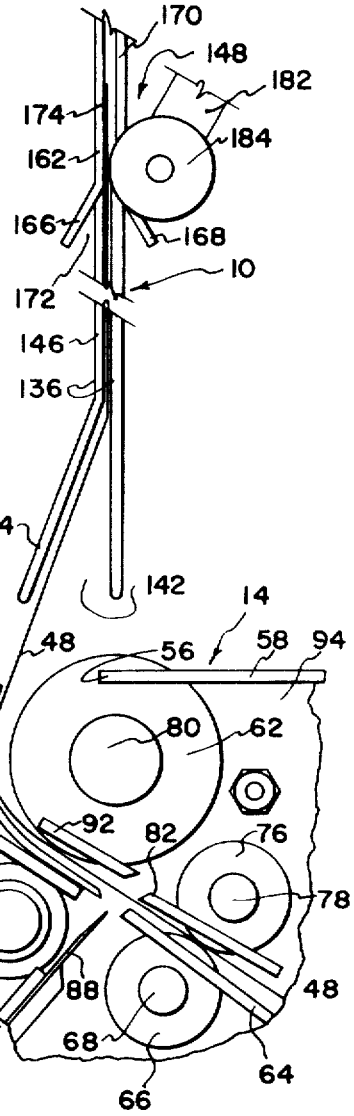
FIG. 5 is a still further enlarged fragmentary detail, portion of which have been broken away to conserve space, showing the web-feeding mechanism of the bottom wrap inserter and the web tracks, pressure plates and roller of the attachment, the roller shown in phantom having been eliminated from the bottom wrap inserter for the present modification.

Briefly in connection with FIG. 5 it will be seen that the web 48 (28a) after leaving the roll 50 (28) passes over the top of an upwardly and rearwardly inclined guide plate 64 (90) that is notched in the same way as coverplate 58 (108) to receive the rubber idler rollers 66 (42f) that are fixedly mounted on rotatable shaft 68 (42d), the latter elements forming parts of the pressure roll transfer section which has been broadly designated by reference numeral 70 (42). Another set of rubber idler rollers 72 (42e), non-rotatably mounted on rotatable shaft 74 (42c), constitute a part of the pressure roll transfer system 70 (42) which is utilized in the conventional bottom wrap inserting apparatus. The second set of idler rollers, 72 (42e), however, are removed from the transfer system so that they are no longer functional when the accessory of the present invention is attached to the bottom wrap inserter. This entire system is rotatably mounted on main drive shaft 34 (58) so that it can rock to-and-fro between the position shown in FIG. 5 and that in which idler rollers 66 (42f) swing to the left away from rollers 76 (128a) that are mounted on driven shaft 78 (128). The latter driven shaft together with another driven shaft 80 (116) that mounts rollers 62 (116a) are operatively connected to main drive shaft 34 (58) through a gear train (not shown) that is clearly described at lines 27–40 in column 4 of Pat. No. 3,250,052.

Spaced above guide plate 64 (90) is another guide plate 82 (112) that loosely receives the web therebetween. A curved guide plate 84 (64) is carried on bracket 86 (62). This curved guide plate curves in spaced relation around the rear of drive rollers 62 (116a) so as to guide the web therebetween and up through transverse slot 56 (108c) in the coverplate 58 (108). The lower edge of the curved guide plate terminates short of the adjacent edge of guide plate 64 (90) so as to leave a transversely-extending gap therebetween sized to pass the cutter blade 88 (82e) of the cutter assembly which has been designated in a general way by numeral 90 (82).

Still another guide plate 92 (110) is located in spaced relation above the lower margin of the curved guide plate 84 (64) and cooperates therewith to confine the web therebetween. This guide plate 92 (110) is spaced rearwardly of guide plate 82 (90) so as to leave a second gap therebetween adapted to accommodate the cutter blade 88 (82e) when the latter is actuated to sever the web. As was the case with coverplate 58 (108), plate 92 (110) is notched to accommodate drive rollers 62 (116a).

The operational sequence of the bottom wrap inserter is set forth in considerable detail in the aforementioned patent beginning on line 50 of colum 5 and continuing through column 6 over to about line 18 in column 7. There are some minor departures from the thus described sequence, however, for present purposes it will suffice to point out that the wrapping sequence is initiated by a stack entering on the incoming conveyor and striking limit switch LS1 located in the path thereof. Limit switch LS1 is provided with two triggering fingers LS1a and LS1b, shown in FIG. 1, which operate in parallel to simply hold the switch in its operative position for a longer period of time as a stack passes over the fingers. Thus, LS1 will be activated when a stack contacts finger LS1a and will not be deactivated until the stack releases finger LS1b. Operation of this limit switch energizes the solenoid-controlled valve 101 that actuates the pneumatic servo-motor 103 which rotates the pressure roll transfer section 70 (42) counterclockwise so that idler rollers 66 (42f) thereof press the web into contact with driven rollers 76 (128a) that feed said web up around the curved guide plate 84 (64) and through the slot 56 (108c) in the coverplate 58 where the leading edge 54 thereof is in position to be engaged by the incoming stack. As soon as the stack leaves LS1, the switch is returned to its original position and the pneumatic servo-motor 103 controlling the pressure roll transfer section 70 (42) is returned to its original position thus disengaging roller 66 (42f) from roller 76 (128a). At this point the leading edge of the incoming stack has engaged the web extending from slot 56 (108c) and the action of the stack being driven across coverplate 58 (108) by rollers 62 with the web sandwiched in between will continue to pull the web out of the slot 56 (108c) and wrap the bottom of the stack.

When LS1 was deactivated to shift the pressure roll transfer section from disengagement with the driven rollers 76 (128a) the return of LS1 to its original position also energized a solenoid controlled valve 105, which let air enter into a pneumatic servo-motor 107 controlling the cutter unit 90. As thus actuated, the cutter blade 88 (82e) moves upwardly and to the right through the gap left between the front and rear sets of guide plates where it severs the web at the point it bridges the latter. A repeated closure of LS1 by another stack retracts the cutter unit to its original position.

Returning again to FIG. 1 and also to FIGS. 2, 3, 4 and 6, it will be seen that the three-sided wrap inserter attachment 10 is mounted atop the channel-shaped side rails 94 in position to receive the leading edge of the web 48 (28a) as it emerges from slot 56 (108c) in the coverplate 58 (108). A pair of transversely-aligned pillow blocks 96 are fastened to the top flange of the side rails and triangular mounting brackets 98 carrying stub shafts 100 are mounted for rotation therein. Adjustable feet 102 are provided on ledges 104 (FIG. 6) that project laterally from the bottom wrapper frame. These feet engage the bottom web of the mounting brackets and support the attachment in its upright position. The pivotal connection with the pillow blocks permits the attachment 10 to be tilted into a forwardly-inclined position (broken lines in FIG. 4) so that access can be had to the cutter drive unit 20 (20) of the bottom wrap inserter through coverplate 58(108). Adjustable stops 106 mounted on the bottom wrap inserter frame engage the inclined edges 108 of the brackets and support the unit in its forwardly-inclined position.

The mounting brackets 98 are each fastened to the front face of main frame uprights 110 that rise vertically alongside the conveying surface of the bottom wrapper table in transversely-spaced parallel relation to one another. A horizontal frame member 112 bridges the upper ends of the uprights and cooperates therewith to define an arch sized to pass the stacks moving therethrough. Suitable corner brackets 114 connect the uprights and horizontal frame members together at the corners.

Figure 2:
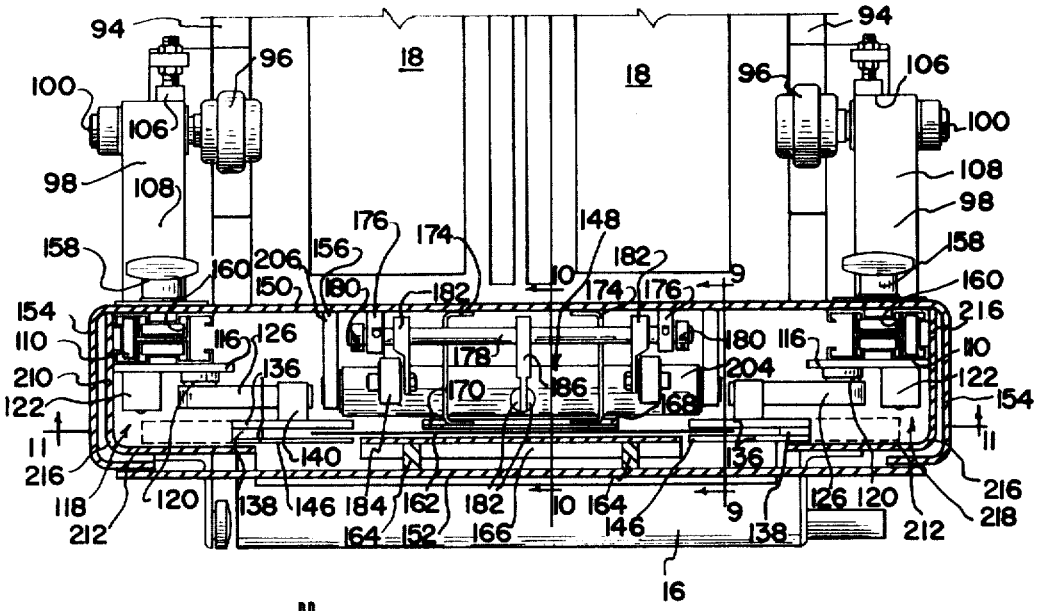
FIG. 2 is a top plan view of the attachment showing it mounted atop the bottom wrap inserter.
Figure 4:
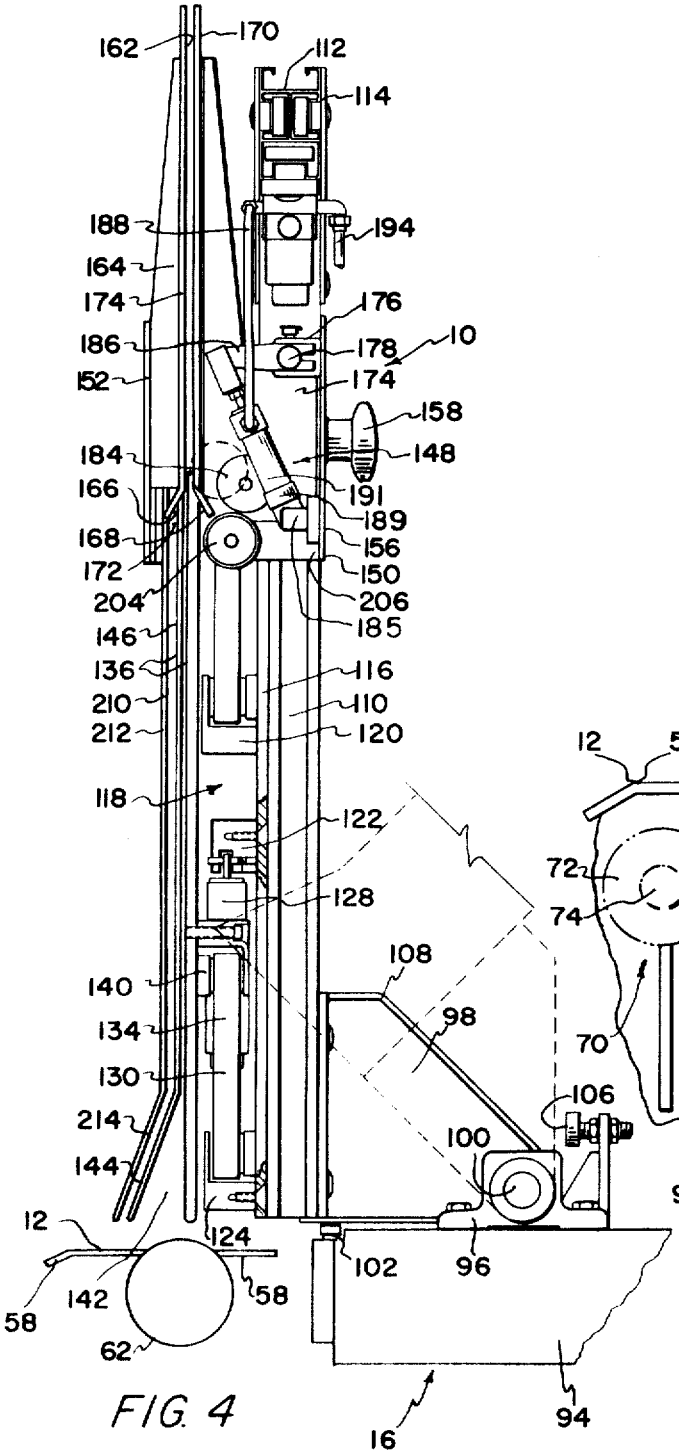
FIG. 4 is a side elevation similar to FIG. 3 but to a larger scale and with the protective shields removed to better reveal the interior construction.

Looking next at FIGS. 2, 4, 6 and 7, it will be seen that a mounting plate 116 covers the rear face of each upright 110 and is used to mount the retractable web guide subassembly that has been indicated in a general way by reference numeral 118. A set of three clevis elements 120, 122 and 124 pivotally mount, respectively, a link 126, a spring-returned pneumatic servo-motor 128, and a bell crank 130. The servo-motor is, of course, connected between clevis 122 and the minor leg 132 of the bell crank and is operative upon actuation to extend the latter from the retracted inoperative position thereof shown in FIG. 7 to the extended operative one shown in FIG. 6. The free end of the major bell crank leg 134 along with the free end of the link 126 are pivotally attached to the front faces of a pair of spaced parallel plates that cooperate with one another to define vertically-slotted tracks 136 that constitute integral parts of the web-guide subassembly 118. The pivot points on opposite ends of the link 126 and major bell crank leg 134 define a parallelogram connection that swings the tracks toward and away from one another while maintaining a transversely-spaced parallel relation therebetween. The plates are held in fixed-spaced track-defining relation by a spacer 138 that is seen most clearly in FIGS. 2 and 6. The pivotal connections to the tracks are, once again, made by clevis elements 140 mounted on the front faces thereof as shown in FIGS. 2 and 4, the term "front" being used herein to designate that portion of the apparatus on the downstream side thereof based upon the flow of stacks on the conveying surface.

Briefly again with reference to FIGS. 4 and 5, it will be seen that the entry way 142 to tracks 136 lies directly above the slot 56 (108c) in the coverplate 108 of the under wrapper 14 where the emerging web 48 (28a) will enter same instead of laying down in front of the stack. To facilitate entry of the web into the tracks 136, the bottom edge 144 of the plate 146 on the near side as seen in FIG. 6 is bent rearwardly to define the flared entry way 142.

With the tracks pulled back into their retracted position indicated by the broken lines in FIG. 2, the space left therebetween is somewhat greater than the width of the web; however, in the extended position thereof shown in full lines in FIGS. 1, 2 and 6, the gap separating the tracks is narrowed to the point where the side margins of the web are confined therein. It is this condition that exists as the system prepares for the arrival of an incoming stack. Actually, the web is literally pushed up the tracks 136 by the feed rollers of the bottom wrap inserter that have already been described. Note, however, that before the stack can move through the arch defined by the uprights 110 and their connecting cross frame element 112, the tracks must be retracted to widen the passage. In order to retract the tracks and still leave the web raised in position to intercept an incoming stack, some means must be provided to hold the web up during the interim.

A web-retaining subassembly that has been broadly referred to by reference numeral 148 serves this important function and a detailed description thereof will now be given in connection with FIGS. 2, 4, 5, 6, 9, 10 and 11 where it is most clearly revealed. A large generally channel-shaped mounting member 150 cooperates with a connecting plate 152 bridging the rearwardly-turned flanges 154 on the ends of the web 156 to define a closed rectangular ring enveloping both uprights 110 to which it is attached in horizontal position spaced beneath cross frame element 112. Actually, the web 156 of the channel-shaped member 150 is adjustably fastened to the uprights 110 by knob-actuated clamp fasteners 158 that slide within vertical tracks 160 in said uprights so as to permit the web-retaining subassembly 148 to be raised and lowered. The web 156 is around on the front of the unit while the connecting plate 154 extends transversely across the rear thereof in spaced relation behind tracks 136 (see FIG. 4).

Fastened to the front face of connecting plate 152 is a pressure plate 162, suitable mounting brackets 164 having been provided on the rear face of the latter. This pressure plate is centered between the uprights 110 and its side margins lie well inside of the tracks when the latter occupy their extended positions as revealed quite clearly in FIGS. 1, 2 and 6. The bottom margin 166 of plate 162 is bent rearwardly so as to cooperate with the forwardly-bent lower edge 168 of a narrower rearwardly-facing guide plate 170 to define a downwardly-flared guide way 172 much like entry way 142 but adapted to receive the center of the web rather than the side margins thereof as it approaches the top of the tracks. These tracks terminate behind connecting plate 152 just above the lower margins of plates 162 and 170 as is most clearly shown in FIG. 4.

A pair of mounting brackets 174 fastened to the rear face of web 156 midway between the ends thereof and to the front face of guide plate 120 hold the latter in narrowly-spaced parallel face-to-face relation with plate 172. It is in the space 174 between these two plates that the leading edge 54 of the web is held when the side margins thereof are released. As previously mentioned, guide plate 170 is a good deal narrower than the pressure plate 162 as is most clearly revealed in FIG. 2.

Outboard of brackets 174 in transverse alignment above the latter are mounted a pair of bearing blocks 176 that fasten to the rear face of the web 156. These blocks journal shaft 178 for rotation therebetween and shaft collars 180 prevent relative axial movement therebetween. Immediately inboard of each bearing block, a roller-carrying arm 182 is affixed non-rotatably to shaft 178 so that upon limited rotation of the latter, they will pass alongside the side margins of guide plate 170 (see FIG. 11) into contact with the wider front surface of pressure plate 162 which faces the latter. Each of these arms is equipped with a roller 184 on the free end thereof which pinches the center section of the web 48 tightly up against pressure plate 162 upon actuation of the web-retaining subassembly 148.

Approximately centered on shaft 178 between the bearing blocks 176 and arms 182 is a crank arm 186 (FIGS. 4 and 9) which is, in turn, pivotally attached to the piston rod [180] *187* of spring-returned pneumatic servo-motor [182] *189*. The cylinder [184] *191* of this servo-motor is pivotally attached to the rear face of web 156 by clevis [186] *185*. Servo-motor [182] *189* has an air line 188 connected thereto from solenoid valve 190. Other air lines 192 leading from this valve connect into the track-extending servo-motors 128. The valve is, of course, connected to a source of compressed air (not shown) by a main air line 194.

Directing the attention briefly to the pneumatic diagram of FIG. 8, it will be seen that the web-retaining subassembly 148 is [in position to hold] *actuated to receive* the web [up for an incoming stack] with the tracks [retracted] *extended*. In other words, the air pressure from line 194 is connected through valve 190 into line 188 so as to actuate servo-motor [182] *189* and hold the piston rod [180] *187* thereof retracted against spring 196 thereby [extending] *retracting* the rollers 184 [into contact with web 48 pinching the latter against the pressure plate 162] *so as to leave space for the web to pass between the rollers and the pressure plate 162*. Meanwhile, branched air lines 192 are connected to the exhaust side of valve 190 (broken lines in FIG. 8) thus permitting the compression springs 198 therein to retract the piston rods 200 and [, therefore,] *extend* the tracks 136 [operated thereby] *to receive the web*. Conversely, upon [actuation] *deactuation* of solenoid 202 to shift valve 190 into its alternate position, the high pressure will be connected through lines 192 to the track-actuating servo-motors 128 which extend their piston rods 200 in opposition to springs 198 thereby [extending] *retracting* the tracks 136. Meanwhile, of course, the roller arm actuating servo-motor [184] *189* will be connected to the exhaust side of valve 190 thus allowing the spring 196 to [retract] *extend* thereby [opening the channel 174 between plates 162 and 170 to receive another web.] *extending the rollers 184 into contact wth the web 48 thus pinching the latter against the presseure plate 162*. Actually, it is the "holding" condition shown schematically in FIG. 8 that is the normal one as the tracks extend only when the bottom wrap inserter 14 is feeding the web out through the slot in the coverplate. The manner in which the operating cycle of the three-sided wrap inserting accessory 10 integrates with that of the bottom wrap inserter 14 will be described in greater detail presently in connection with the electrical diagram of FIG. 12.

Directing the attention, once again, to FIG. 4, it will be noted that with the pinch rollers 184 actuated into the broken line position holding the web against the pressure plate 162, it becomes a simple matter to pull the web free thereof when an incoming stack impringes thereagainst. That portion of the web pinched behind the roller will merely slide down the front face of pressure plate 162 turning the roller counterclockwise as it goes. On the other hand, when the web is being pushed up the tracks, it will not enter between plate 162 and rollers 184 unless the latter elements are retracted to open channel 174.

Figure 10:
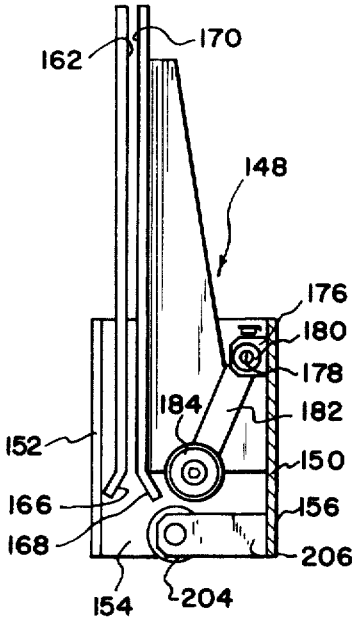
FIG. 10 is a fragmentary section taken along line 10—10 of FIG. 2.
Figure 9:
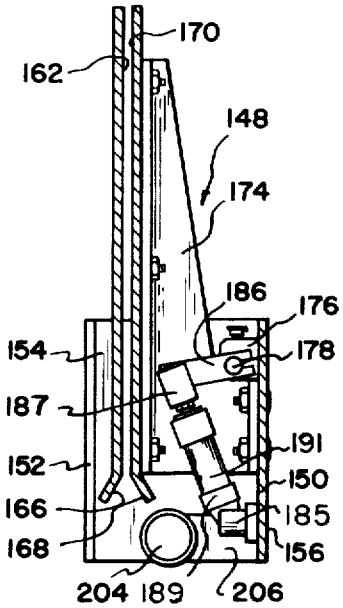
FIG. 9 is a fragmentary section taken along line 9—9 of FIG. 2.
Figure 11:
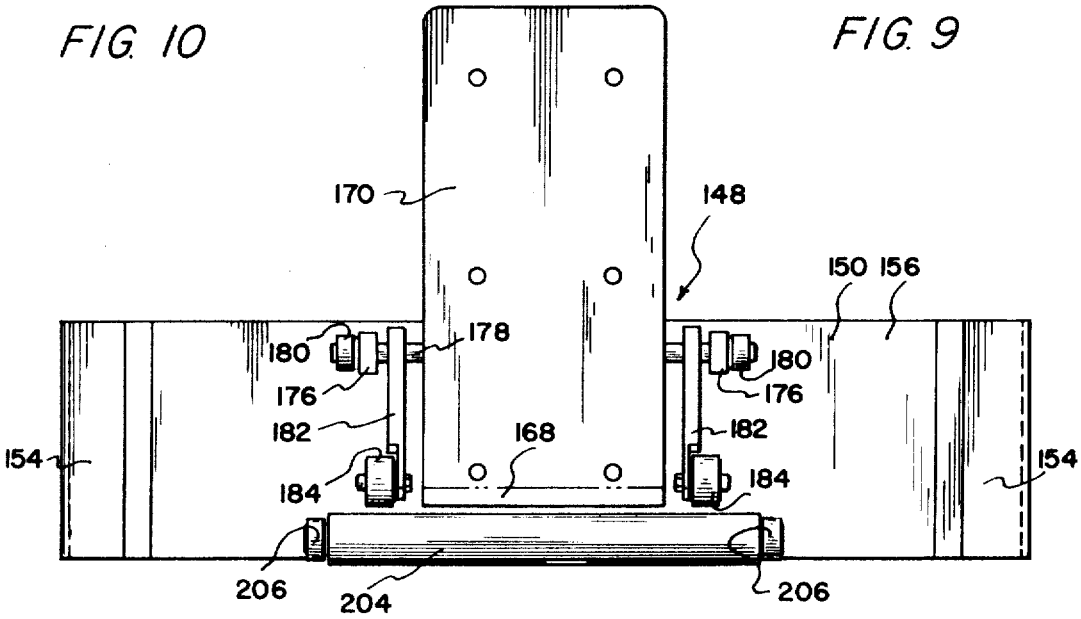
FIG. 11 is a section taken along line 11—11 of FIG. 2.

As the web is pulled free of the pinch rollers by means of a stack moving through the arch, it is likely to tear as it strikes the lower edge of guide plate 170; therefore, a roller 204 is preferably journalled for rotation at the lower forward edge of guide way 172, a position which is most clearly revealed in FIG. 4. FIGS. 9, 10 and 11 show this same roller journalled for rotation between a pair of transversely-spaced journals 206 fastened to the web 156 near the bottom edge thereof.

Just a few mechanical features remain to be described and these are seen most clearly in FIGS. 1, 2, 3 and 6 to which reference will now be made. A flexible curtain 208 hangs down from the web 156 of channel-shaped member 150 in front of the web. This curtain extends down into the path of the incoming stack and, when the latter moves through the arch onto the outgoing conveyor, it drapes over the upper leading edge of the stack and folds the web back along the top thereof.

Another of these previously undescribed elements is the protective corner shield 210 that has a generally L-shaped cross section and covers the web-guide subassembly 118. The transverse flange 212 of these protective plates lies spaced a short distance in front of connecting plate 152 yet well behind the rear element 146 of the track 136 which it parallels including the rearwardly inclined bottom edge 214 (see FIG. 4). The adjacent inner margins of protective plate flanges 212 terminate just about even with the corresponding margins of the tracks 136 when the latter occupy their retracted positions so as to not block free movement of the stacks through the arch. The longitudinally-extending flanges 216 are fastened directly to the outside of the uprights 210 inside the flanges 154 of the channel-shaped member 150 as shown in FIG. 2. These protective shields may be removed to provide access to the web-guide subassembly 118 by merely sliding them out from behind the channel-shaped member.

Figure 3:
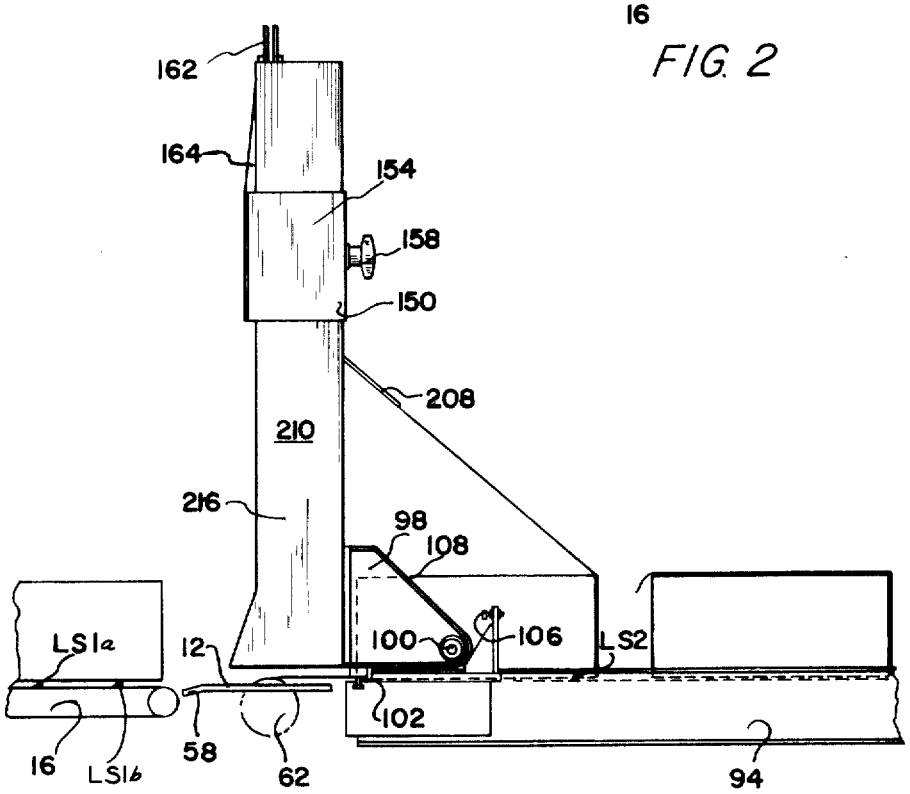
FIG. 3 is a fragmentary side elevation to a reduced scale showing somewhat diagrammatically how the attachment of the present invention cooperates with a conventional bottom wrap inserter to insert a three-sided wrap on the top, bottom and front face of a stack.
Figure 12:
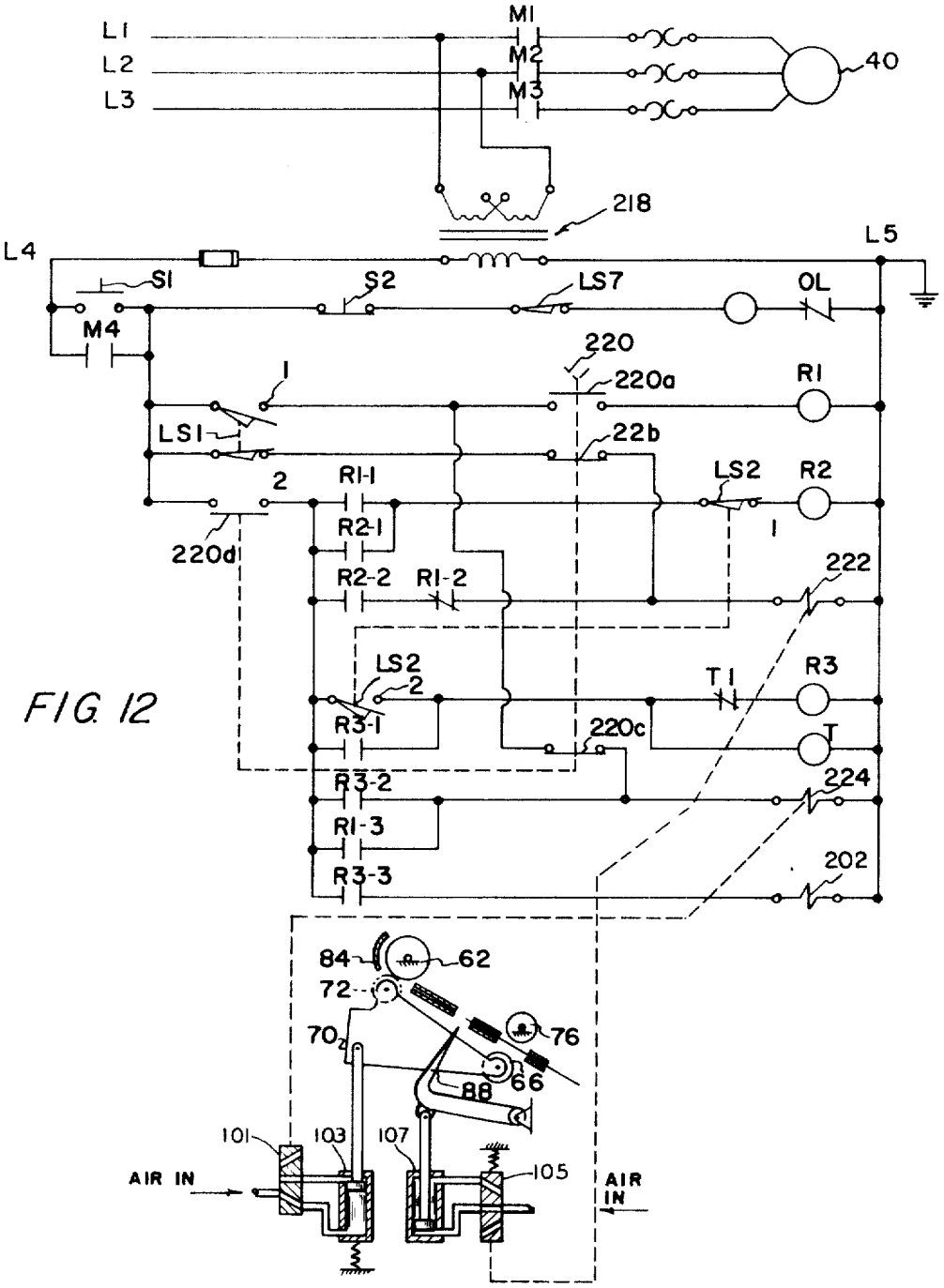
FIG. 12 is a schematic view of the electrical control circuit for the attachment in combination with the bottom wrap inserter.

Finally, with reference to FIGS. 1, 3 and 12 of the drawings, the electrical circuit will be set forth in detail. The motor 40 (26) of the device is connected to a three-phase, 60-cycle, A.C. source of 220 or 440 volts, lines L1, L2, and L3 of FIG. 12. The control components for the device are connected through step down transformer 218 to the lines L1 and L2 to provide 110-volt control power to lines L4 and L5. The control circuit diagram of FIG. 12 depicts the device in its normal unactivated state. The present device can be operated either as a bottom wrap inserter or as a three-sided wrap inserter by proper positioning of selector switch 220 which consists of four single pole switches ganged together as shown in FIG. 12. This selector switch will be referred to as having switches 220a, 220b, 220c and 220d. For single bottom wrap operation switches 220a and 220d will be open and switches 220b and 220c will be closed as shown in FIG. 12 and for three-sided wrap operation all four switch states will be just reversed, namely, 220a and 220d closed and 220b and 220c open.

To operate the device as a single bottom wrap inserter, push button start switch S1 is momentarily depressed causing energization of motor contactor coil M through S1, a normally closed stop switch S2, a safety interlock switch LS7, and normally closed overload contacts OL, to close contacts M1, M2, M3 and M4. Contacts M1, M2 and M3 activate the drive motor and M4 closes to maintain a circuit around momentary push button S1 after the push button is released. With the drive motor 40 (26) activated, conveyors 16 (16) and 18 (18) along with the cutter drive unit 20 (20) will be running preparatory to feeding the web and conveying stacks. At this point limit switch LS1 is in the position shown in FIG. 12 with contact 1 open and contact 2 closed. Contact 2 of LS1 being closed completes a path from L4 to L5 through switch contact 220b and cutter blade control valve solenoid 222 thereby energizing that solenoid and causing the cutter blade to be in its up position in the path of the web. Since contact 1 is open the circuit from L4 to L5 through LS1, switch 220c, and transfer section control valve solenoid 224 is open causing this solenoid to be de-energized and the transfer section to be rotated away from the driven rollers 76 (128a) so that the web is not being driven.

As a stack enters on the incoming conveyor and strikes limit switch LS1, the normally open contact 1 will be closed and the normally closed contact 2 will be opened. The opening of contact 2 will cause cutter blade solenoid 222 to be de-energized and the blade 88 (82e) will be retracted from the path of the web. Closing of contact 1 will complete a circuit through LS1–1, switch 220c, and transfer section solenoid 224 thereby energizing the solenoid and causing the transfer section to be rotated so that idler rollers 66 (42f) press the web into contact with the driven rollers 76 (128a) and thereby drive the web up and through the slot 56 (108c) where the leading edge thereof is in position to be engaged by the incoming stack. As soon as the stack passes over LS1 the limit switch returns to its normal position with contact 1 open and contact 2 closed. Thus transfer section solenoid 224 will be de-energized and transfer section rotated away from the driven rollers to cease feeding of the web. Also, cutter blade solenoid 222 will again be energized and the cutter blade will be moved upward and through the web to sever it from the roll. The device is now at its original position ready for another stack to initiate the same operations.

For operation in the three-sided wrap mode, selector switch 220 is moved to its alternate position so that switches 220a and 220d are closed and switches 220b and 220c are open. [As a starting point it] *It* will be assumed that *at this point* a web sheet extends through slot 56 (108c), up the arch opening, and is held at the top between rollers 184 and plate 162. At this point since switch 220b is open, cutter blade solenoid 222 is de-energized and the web extending to the top of the arch is still fastened to the supply roll. Also switches LS1–1 and 220c are open, transfer section solenoid 224 is therefore de-energized, and the web is not being driven by the coaction of rollers 66 (42f) and 76 (128a). Thus, the device is ready to put a three-sided wrap on an incoming stack.

As a stack moves onto the incoming conveyor, LS1 is depressed, contact 1 closed, and contact 2 opened. The closing of LS1–1 completes a circuit through LS1–1, the now closed switch 220a and relay coil R1 thereby energizing R1. Energization of R1 will cause contacts R1–1 and R1–3 to close and R1–2 to open. A circuit is now closed through 220d, R1–1, normally closed LS2–1, and relay coil R2 to cause energization of R2. R2 energization closes R2–1 to provide a path around contacts R1–1 and closes R2–2. The closing of R2–2 would have the effect of energizing cutter blade solenoid 222 except for the fact that R1 has been energized to open R1–2 and therefore solenoid 222 is left de-energized. The energization of R1–3 closes a circuit through 220d and R1–3 to energize transfer section solenoid 224 and thereby begin driving the web through the slot 56 (108c) as the leading edge of the stack engages the web at slot 56 (108c). The device will continue to operate in this state until the stack passes off of LS1 and it returns to its normal position of contact 1 open and contact 2 closed. As contact 1 is opened R1 will be de-energized causing R1–1 and R1–3 to open and R1–2 to close. Opening of R1–3 will de-energize transfer section solenoid 224 and roller 66 (42f) will be moved away from the web and roller 76 (128a) to cease driving of the web. R2 will remain energized through its own contacts R2–1 even though R1–1 is now open. Thus R2–2 remains closed, and since R1–2 is now closed, cutter blade solenoid 222 will be energized to cause the cutter to sever the extended web from the supply roll. The stack will now continue to be propelled through the arch by rollers 62 and pull the web down and out from under rollers 184 while the bottom of the stack is engaged with the lower end of the web to extract the latter from the slot 56 (108c) and cover the bottom of the stack.

The stack will now continue out onto the outgoing conveyor until it has fully cleared the arch and slot 56 (108c) whereupon it will strike the trigger arm of limit switch LS2 which is located in the stack's path. LS2 will then be operated to open LS2–1 and close LS2–2. The opening of LS2–1 will de-energize R2 which will in turn open R2–1 and R2–2. R2–2 opening causes cutter blade solenoid 222 to be de-energized and the cutter blade to be retracted out of the web's path. LS2–2 closing energizes relay R3 through normally closed contacts T–1 and directly energizes time off relay T. Upon energization of time off relay T contacts T–1 will remain in their normally closed position for a predetermined time interval and then automatically open at the end of said interval. Thus R3 will be energized through LS2–2 and T–1 for the predetermined time interval of T. Energization of R3 closes its associated contacts R3–1, R3–2 and R3–3 to initiate feeding of the next web sheet up the arch. The closing of R3–1 merely provides a path to retain R3 energized even if LS2–2 subsequently opens. When R3–3 closes solenoid 202 will be energized *as shown in FIG. 8* and tracks 136 will move to their extended operative position preparatory to guiding the web up the arch. Activation of solenoid 202 also causes rollers 184 to retract and be in a position to receive the leading edge of the web. R3–2 closing energizes the transfer section solenoid 224 thereby causing the web to be driven upward through slot 56 (108c) and tracks 136 to the top of the arch. It is here that the preset time interval of time-off relay T comes into play in that the interval is selected to be the length of time required to drive the web completely to the top of the arch. At the end of this time interval contacts T–1 will open and R3 will be de-energized thus opening R3–1, R3–2 and R3–3. The opening of these contacts opens the path around LS2–2, de-energizes the transfer section solenoid 224, and de-energizes solenoid 202, respectively. At this point then the web is no longer being driven, tracks 136 are retracted, and rollers 184 are moved against the web to hold it at the top of the arch. As the stack continues to be moved down the outgoing conveyor it moves off of LS2 and that switch is returned to its original position which results in no additional activations of the circuit. The device is now again ready to receive and wrap the next incoming stack from the conveyor.

What is claimed is:

1. The three-sided wrap inserting attachment for use with a bottom wrap inserter of the type having a horizontal conveying surface defined by longitudinally-aligned incoming and outgoing conveyors separated by a coverplate having a transverse web-receiving slot therein, web-feeding means located beneath the web-receiving slot operative upon actuation to feed a length of web up through the latter from a supply roll thereof, web-severing means located between the web-feeding means and coverplate operative upon actuation to cut a length of web free of the supply roll, and drive means operatively connected to the incoming and outgoing conveyors and to the web-feeding means, which comprises: frame means defining an upstanding arch mountable atop the conveying surface in position to bridge the web-receiving slot therein, said arch having an opening therethrough sized to pass a stack of articles to be bundled; web-guiding means carried by the frame means on opposite sides of the arch and at the ends of the transverse slot, said web-guiding means being operative upon actuation to extend and engage the side margins of the web as it emerges from the slot, and said means being adapted when so extended to guide said web upwardly therebetween; web retaining means carried by the frame means at the top of the arch, said means being operative upon actuation to engage and hold the web while the web-guiding means is retracted to release the side margins of the latter and open a passage for the movement of a stack therebetween; first servo-motor means operatively connected to the web-guiding means; second servo-motor means operatively connected to the web-retaining means; and, control means connected to the first and second servo-motor means operative in response to the movement of a stack onto the outgoing conveyor surface to actuate the first servo-motor means and deactivate the second.

2. The attachment as set forth in claim 1 in which: the web-guiding means comprises a pair of vertically-slotted tracks arranged in transversely-spaced parallel relation for movement toward and away from one another longitudinally of the transverse slot.

3. The attachment as set forth in claim 1 in which: the web-retaining means comprises a plate fixed in position behind the leading edge of the web as it moves upwardly between the web-guiding means, and a roller located in front of the plate for movement between a retracted position and an extended position in engagement with the latter.

4. The attachment as set forth in claim 1 in which: the first and second servo-motor means are of the fluid-actuated piston type; and, in which the control means includes a source of fluid under pressure connected to the first and second servo-motor means and a two position control valve operative to alternately actuate and deactuate the latter.

5. The attachment as set forth in claim 1 in which: the web-retaining means is mounted on the frame means for vertical adjustment relative thereto.

6. The attachment as set forth in claim 1 in which: the control means includes a timer operative to return the first and second servo-motor means to their original state following the elapse of a predetermined time interval.

7. The attachment as set forth in claim 2 in which: the tracks are flared at the lower ends thereof.

8. The attachment as set forth in claim 3 in which: a second plate narrower than the pressure plate is located in front of the latter in spaced face-to-face relation thereto; and, in which the roller is located in front of and to one side of said second plate in position to engage a portion of said pressure plate projecting therebeyond.

9. The attachment as set forth in claim 8 in which: the web-retaining means includes a second roller journalled for rotation about a horizontal axis at the lower edge of the second plate, said second roller being sized and adapted to roll against the front face of the web as the stack pulls the leading edge thereof free of the first roller.

10. The apparatus for inserting a wrap around three sides of a stack of articles to be bundled which comprises: longitudinally-aligned incoming and outgoing conveyors with a transversely-slotted coverplate therebetween cooperating to define a horizontal conveying surface; web-feeding means located beneath the slotted plate operative upon actuation to feed a length of web from a supply roll thereof up through said slot, said means including a driven feed roller, an idler roller mounted for movement relative to the driven roller between a retracted position and an extended position in rolling engagement therewith, and first servo-motor means connected to the driven roller operative upon actuation and deactuation to shift the latter between its retracted and extended positions; web-severing means located between the web-feeding means and coverplate operative upon actuation to cut a length of the web free of its supply roll to form the wrap, said web-severing means including a blade mounted for movement between a retracted inoperative position and an extended one adapted to engage and cut said web, and second servo-motor means connected to said blade operative upon actuation and deactuation to shift the latter between its extended operative and retracted positions; web-guiding means mouned atop the conveying surface at opposite ends of the slot in the coverplate, said means including a pair of upstanding vertically-slotted tracks mounted in transversely-spaced parallel relation for relative movement longitudinally of the slot between a retracted inoperative position and an extended operative one adapted to receive the side margins of the web as it emerges from said slot and confine same while the web-feeding means pushes the leading edge thereof into an elevated position in front of an incoming stack, and third servo-motor means connected to the vertically-slotted tracks operative upon actuation and deactuation to shift the latter between their extended and retracted positions; web-retaining means mounted at the upper end of the web-guiding means operative upon actuation to engage and hold the leading edge of the web as it rises between the slotted tracks while the latter elements are retracted to open a passage for the stack to pass therebetween, said retaining means including a pressure plate located on one side of the leading edge of the web in its elevated position, a pinch roller mounted on the opposite side of the web for movement between a retracted inoperative position and an extended operative one adapted to releasably squeeze the latter against the pressure plate, and fourth servo-motor means connected to the pinch roller operative upon actuation and deactuation to shift the latter between its extended and retracted positions; drive means operatively connected to the incoming and outgoing conveyors and to the driven roller of the web-feeding means; and, control means connected to the four servo-motor means operative to selectively actuate and deactuate same in response to the movement of a stack across the incoming and outgoing conveyors, said control means including a first switch means mounted on the incoming conveyor responsive to the movement of a stack thereacross, said switch means being operative upon actuation by an incoming stack to actuate the first servo-motor means so as to shift the idler roller of the web-feeding means into extended position, and said first switch means being operative upon deactuation as the stack leaves the incoming conveyor to deactuate said first servo-motor means while actuating the second servo-motor means so as to shift the blade of the web-severing means into extended position, a second switch means mounted on the outgoing conveyor responsive to the movement of a stack thereacross, said second switch means being operative upon actuation by an incoming stack to deactuate the second servo-motor means to retract the blade of the web-severing means, and timer means cooperating with said second switch means upon actuation of the latter to actuate the first and third servo-motor means while deactuating the fourth servo-motor means for the predetermined time interval required for the web-feeding means to elevate the leading edge of the web into position to be engaged by the web-retaining means.

11. The apparatus as set forth in claim 10 in which: the web-retaining means is vertically-adjustable relative to the coverplate.

12. The apparatus as set forth in claim 10 in which: the lower ends of the slotted tracks are flared to guide the leading edge of the web therein.

13. The apparatus as set forth in claim 10 in which: the web-retaining means includes a second plate in spaced face-to-face relation to the pressure plate cooperating therewith to define a centrally-located track positioned to receive the leading edge of the web as it rises between the slotted tracks of the web-guiding means.

14. The apparatus as set forth in claim 10 in which: the pressure plate is located behind the web and the roller in front thereof.

15. The apparatus as set forth in claim 13 in which: the pressure plate is behind the web, the second plate is in front of the web and is narrower than the pressure plate, and the pinch roller is located in front of the second plate for movement alongside thereof into engagement with the pressure plate.

16. The apparatus as set forth in claim 14 in which: a second roller is journalled for rotation along the lower edge of the second plate, said roller being in rolling engagement with the web as the leading edge thereof is pulled free of the web-retaining means by movement of the stack thereagainst.

17. The apparatus as set forth in claim 15 in which: a shaft is journalled for rotation about a horizontal axis located in front of the second plate, said shaft projecting beyond the side margin of the latter, a first crank arm is fixed to the projecting end of the shaft and a second crank arm intermediate the ends thereof, and in which the pinch roller is carried by the first crank arm and the fourth servo-motor means is operatively connected to the second crank arm.

18. The method of covering the top, bottom and leading face of a stack with a single wrapper preparatory to bundling same as it advances on a conveying surface which comprises the steps of: confining the side margins of a web between a pair of vertically-disposed tracks while it is pushed upwardly into a standing position blocking the advance of the incoming stack from a supply roll located beneath the conveying surface, yieldably gripping the leading edge of the web so as to maintain same in standing position while its side margins are released by retracting the tracks to permit the bundle to pass therebetween, and cutting the web free of its supply roll from underneath the conveying surface as the stack advances thereagainst,

References Cited

The following references, cited by the Examiner, are of record in the patented file of this patent or the original patent.

UNITED STATES PATENTS

| | | | |
|---|---|---|---|
| 2,894,363 | 7/1959 | Voogd | 53—389 X |
| 2,718,739 | 9/1955 | Mast | 53—228 X |
| 3,000,151 | 9/1961 | Winkler | 53—198 RX |
| 3,250,053 | 5/1966 | Hyer | 53—389 X |

FOREIGN PATENTS

| | | | |
|---|---|---|---|
| 695,921 | 10/1964 | Canada | 53—228 |

TRAVIS S. McGEHEE, Primary Examiner

JOHN SIPOS, Assistant Examiner

U.S. Cl. X.R.

56—66, 228, 389